United States Patent [19]
Okazoe et al.

[11] Patent Number: 6,001,321
[45] Date of Patent: Dec. 14, 1999

[54] EXHAUST GAS TREATMENT APPARATUS AND METHOD

[75] Inventors: Kiyoshi Okazoe; Eiji Ochi; Makiichi Ishihara, all of Tokyo; Toru Takashina, Hiroshima, all of Japan

[73] Assignee: Mitsubishi Heavy Industries, Ltd., Tokyo, Japan

[21] Appl. No.: 08/923,657

[22] Filed: Sep. 4, 1997

[30] Foreign Application Priority Data

Sep. 20, 1996 [JP] Japan ................................ 8-271558

[51] Int. Cl.$^6$ .......................... C01B 17/00; B01D 53/34
[52] U.S. Cl. .................. 423/243.01; 422/169; 422/171; 422/224; 422/225; 422/108; 423/235; 423/237; 423/243.08; 423/555
[58] Field of Search ..................... 422/171, 108, 422/170, 169, 168, 224–225, 234; 423/555, 235, 237, 243.01, 242.1, 243.08, 242.2, 215.5; 95/128, 169, 232, 37; 96/109

[56] References Cited

U.S. PATENT DOCUMENTS 5,132,027  7/1992  Ukawa et al. .......................... 423/555
5,246,678  9/1993  Ochi et al. .......................... 423/243.08
5,840,263  11/1998  Shinoda et al. .......................... 422/169

FOREIGN PATENT DOCUMENTS 06327927  11/1994  Japan .

*Primary Examiner*—Hien Tran
*Attorney, Agent, or Firm*—Myers Bigel Sibley & Sajovec, P.A.

[57] ABSTRACT

An exhaust gas treatment apparatus for the removal of at least a sulfur dioxide gas and ammonia from an exhaust gas by bringing the exhaust gas into vapor-liquid contact with an absorbing liquid comprises an introduction-side tank to which the absorbing liquid is supplied, a parallel-flow type absorption tower positioned above the introduction-side tank; an ejection side tank positioned adjacent the introduction side tank; a counter-flow type absorbing tower positioned above the ejection side tank; a mist eliminator for removing splash mist from the exhaust gas; and a controller for controlling the pH of the absorbing liquid in one of the introduction-side absorption tower and the ejection-side absorption tower.

2 Claims, 4 Drawing Sheets

EXHAUST GAS TREATMENT APPARATUS AND METHOD

BACKGROUND OF THE INVENTION

Field of the Invention and Related Art Statement

This invention relates to an exhaust gas treatment apparatus and method which can effectively remove sulfur and ammonia from an exhaust gas in a small-sized apparatus constitution, particularly to an apparatus and a method for exhaust gas treatment which can attain a high ammonia removal ratio.

As such a type of an exhaust gas treatment method, conventionally known is a method for removing sulfur oxides (mainly a sulfur dioxide gas) and the like from an exhaust gas by subjecting an absorbing liquid having an absorber such as limestone suspended therein and the exhaust gas to vapor-liquid contact by using a packed absorption tower (a vapor-liquid contact tower) or a spray type or liquid-column type absorption tower.

In general, the conventional packed-type exhaust gas treatment apparatus or spray type or liquid-column type exhaust gas treatment apparatus is essentially formed of one vapor-liquid contact tower per absorbing liquid tank. Such a constitution however has imposed a limitation to the size reduction, cost reduction and maintainability improvement as well as improvement in the performance of desulfurization.

Described specifically, in order to heighten the performance, an increase in the row number of spray nozzles to be installed in the case of the spray type, an increase in the height of the liquid column in the case of the liquid-column type and an increase in the height of the packed portion in the case of the packed type are required, which causes a marked increase in the whole size of the apparatus (particularly, the height of the absorption tower), the number of ducts or pipes connected with the apparatus or an installation height, resulting in the considerable increase in the capacity or power of a pump for pumping up the absorbing liquid.

The present inventor has therefore proposed in Japanese Patent Application No. HEI 5-118171 (Japanese Patent Application Laid-Open No. HEI 6-327927) an apparatus which exceeds the limitation of the conventional apparatus and has improved performance and reduced size.

The proposed apparatus is a so-called parallel counter flow type in which two liquid-column type absorption towers (parallel flow type and counter flow type) are aligned above a tank for storing an absorbing liquid and an exhaust gas is introduced into each absorption tower successively, where vapor-liquid contact of the exhaust gas with an absorbing liquid is effected in each tower. Such a constitution makes it possible to reduce the whole size (mainly a reduction in the height of the absorption tower) and to reduce the cost (reduction in both the equipment cost and operation cost) and moreover to improve the desulfurization and dedusting performance.

A description will next be made of one example of a conventional exhaust gas treatment method using such a parallel-counter flow type vapor-liquid contact apparatus, with reference to FIG. 3.

In this exhaust gas treatment method, employed is a vapor-liquid contact apparatus formed of a tank 1 to which an absorbing liquid (which will hereinafter be called "absorbent slurry") having an absorbent containing limestone suspended therein is fed; a liquid-column type introduction-side absorption tower 2 which extends upward from one side portion of the tank 1 and brings an untreated exhaust gas A into vapor-liquid contact with the absorbent slurry in the tank 1; and a liquid-column type ejection-side absorption tower 3 which extends upward from the other side portion of the tank 1 and brings the exhaust gas from the introduction-side absorption tower 2 into vapor-liquid contact with the absorbent slurry in the tank 1 again.

Here, the introduction-side absorption tower 2 is a so-called parallel flow type absorption tower in which an untreated exhaust gas A flows downward, introduced from the upper part. The ejection side absorption tower 3 is a so-called counter flow type absorption tower in which an exhaust gas ejection portion (not illustrated) for ejecting the treated exhaust gas B is formed at the upper part of the tower and the exhaust gas passing through the introduction-side absorption tower 2 and then the upper part of the tank 1 flows upward.

In the absorption towers 2,3, spray pipes 4,5, each in plural, are arranged in parallel, respectively. Each of these spray pipes 4,5 has plural nozzles (not illustrated) for injecting the absorbent slurry upward in the form of a liquid column.

Disposed outside the tank 1 are circulation pumps 6,7 for sucking the absorbent slurry from the tank 1. The absorbent slurry is fed into spray pipes 4,5 through circulation lines 8,9, respectively and then, injected upward from each nozzle.

The apparatus as shown in FIG. 3 is equipped with a so-called arm rotating type air sparger 10 for blowing oxidation air C in the form of fine air bubbles into the tank 1 while stirring the slurry in the tank 1, whereby the absorbent slurry which has absorbed a sulfur dioxide gas is efficiently brought into contact with air to cause complete oxidation, thereby affording gypsum.

According to this method, the absorbent slurry, which is brought into vapor-liquid contact with the exhaust gas after being injected from the header pipe 4 or 5 in the absorption tower 2 or 3 and flows downward while absorbing a sulfur dioxide gas and dust, is oxidized by being brought into contact with many air bubbles blown and stirred by the air sparger 10 in the tank 1, and then causes neutralization reaction, whereby a slurry containing gypsum at a high concentration is obtained. Incidentally, the main reactions occurring during the above treatment can be indicated by the following reaction formulas (1) to (3).

(Exhaust gas introduction portion of absorption tower)

$$SO_2 + H_2O \rightarrow H^+ + HSO_3^- \tag{1}$$

(tank)

$$H^+ + HSO_3^- + 1/2 O_2 \rightarrow 2H^+ + SO_4^{2-} \tag{2}$$

$$2H^+ + SO_4^{2-} + CaCO_3 + H_2O \rightarrow CaSO_4 \cdot 2H_2O + CO_2 \tag{3}$$

In the tank 1, a large amount of gypsum, a small amount of limestone as an absorbent and a slight amount of powdery dust collected from the exhaust gas regularly exist in the form of a suspension or solution. This slurry in the tank 1 is fed to a solid-liquid separator 11 through a pipe line 9a branched from the circulation line 9 and is then collected by filtration as gypsum D having a small water content. The filtrate from the solid liquid separator 11, on the other hand, passes through a filtrate tank 12 and then pumped out by a pump 13. A portion of the filtrate is returned to the tank 1 as a water content to form an absorbent slurry, while another portion is discharged as a desulfurized waste water E in order to prevent the accumulation of impurities.

To the tank 1 under operation, limestone which is an adsorbent is supplied from a slurry preparation tank 15 as a slurry. The slurry preparation tank 15 has an agitator 16 and there, powdery limestone F charged from a silo (not illustrated) and water G supplied (industrial water or the like) are stirred and mixed, whereby an absorbent in the form of a slurry is prepared. The absorbent so prepared is then supplied by a slurry pump 17 to the tank 1 as needed.

In addition, make-up water (industrial water or the like) is supplied to the tank 1 to supplement the water content which shows a gradual decrease by the evaporation in the absorption towers 2,3.

During operation, the flow rate of the make-up water to the tank 1 or the flow rate of the slurry ejected from the pipe line 9a is controlled, whereby a slurry containing predetermined concentrations of gypsum and adsorbent is always stored in the tank 1 in an amount within a predetermined range.

During operation, a boiler load (flow rate of the exhaust gas A), a sulfur dioxide gas concentration in the untreated exhaust gas A, and pH and limestone concentration in the tank 1 are detected by sensors with a view to maintaining the desulfurization ratio and gypsum purity at a high level. Based on these detection results, a supply rate of the limestone to the tank 1 is adjusted by a controller (not illustrated) as needed. In general, the pH in the tank 1 is conventionally adjusted to 6.0 or so in order to promote the above-described oxidation reaction, while maintaining the high absorption performance of the sulfur dioxide gas, thereby preparing high-purity gypsum.

The exhaust gas treatment method using the above-described vapor-liquid contact apparatus of a parallel counter flow type which method has been proposed and industrialized by the applicant, however, is accompanied with the problem that when the untreated exhaust gas A contains ammonia, this ammonia is released as a gas in the counterflow type ejection-side absorption tower 3 and is then inevitably discharged while being contained in the treated exhaust gas B.

For example, an exhaust gas treatment equipment for an oil burning boiler of a thermal electric power plant, sulfur trioxide ($SO_3$) contained in the exhaust gas is collected as ammonium sulfate (($NH_4)_2SO_4$) so that ammonia is generally poured into the exhaust gas at the flow prior to a desulfurizing apparatus, and an untreated exhaust gas A to be introduced to the desulfurizing absorption tower therefore contains about 100 ppm of ammonia at the maximum. In the conventional parallel counter flow type vapor-liquid contact apparatus as illustrated in FIG. 3, a large portion of the ammonia is dissolved and absorbed in the slurry in the parallel flow type introduction-side absorption tower 2 so that the ammonia concentration in the exhaust gas lowers to about 10 ppm at the maximum at the outlet portion of the introduction-side absorption tower 2. The slurry injected to the upper part of the ejection-side absorption tower 3 and brought into contact with the exhaust gas has pH as high as about 6, which increases the partial pressure of ammonia at the upper part of the absorption tower 3. Ammonia in the slurry is released again to the gas side, resulting in an increase in the ammonia concentration in the treated exhaust gas B to about 50 ppm at the maximum.

Incidentally, the exhaust gas control in Japan has not applied to ammonia yet, but it is desired to minimize the ammonia concentration in the treated exhaust gas B to be released into the air from the viewpoint of the air pollution prevention. There is accordingly a demand for the exhaust gas treatment method which can accomplish the size reduction of the apparatus and high desulfurization performance and at the same time reduce the amount of discharged ammonia.

SUMMARY OF THE INVENTION

An object of the present invention is therefore to provide an exhaust gas treatment method which can control the ammonia concentration in the treated exhaust gas at a low level even by employing as an essential constitution a parallel counter flow type vapor-liquid contact apparatus comprising a parallel flow type absorption tower and a counter flow type absorption tower.

With a view to attaining the above object, the exhaust gas treatment apparatus according to the present invention for the removal of at least a sulfur dioxide gas and ammonia from an exhaust gas by bringing the exhaust gas to vapor-liquid contact with an absorbing liquid comprises: an introduction-side tank to which the absorbing liquid is supplied; a parallel-flow type introduction-side absorption tower, which is disposed extensively above the introduction-side tank, for introducing an untreated exhaust gas from the upper part of the tower and bringing the exhaust gas into vapor-liquid contact with the absorbing liquid in the introduction-side tank; an ejection-side tank, which is disposed adjacent to the introduction-side tank and to which the absorbing liquid is supplied separately from the introduction-side tank; a counter-flow type ejection-side absorption tower, which is disposed extensively above the ejection-side tank, for introducing from the lower part of the tower the exhaust gas ejected from the introduction-side absorption tower and bringing the gas into vapor-liquid contact with the absorbing liquid in the ejection-side tank; a mist eliminator for removing splash mist from the exhaust gas, which is ejected from the introduction-side absorption tower but not still introduced into the ejection-side absorption tower, and returning it to the introduction-side tank; and a controller for controlling the pH of the absorbing liquid in one of the introduction-side absorption tower and ejection-side absorption tower to a value low enough (for example from 4.0 to 5.0) not to easily cause release of ammonia into the exhaust gas.

The exhaust gas treatment method according to the present invention for the removal of at least a sulfur dioxide gas and ammonia from the exhaust gas by bringing the exhaust gas into vapor-liquid contact with an absorbing liquid comprises: using a vapor-liquid contact apparatus equipped with an introduction-side tank to which the absorbing liquid is supplied, a parallel-flow type introduction-side absorption tower, which is disposed extensively above the introduction-side tank, for introducing from the upper part of the tower an untreated exhaust gas and bringing the exhaust gas into vapor-liquid contact with the absorbing liquid in the introduction-side tank; an ejection-side tank, which is disposed adjacent to the introduction-side tank and to which the absorbing liquid is fed separately from the introduction-side tank; a counter-flow type ejection-side absorption tower, which is disposed extensively above the ejection-side tank, for introducing from the lower part of the tower the exhaust gas ejected from the introduction-side absorption tower and bringing the gas into vapor-liquid contact with the absorbing liquid in the ejection-side tank; removing splash mist from the exhaust gas, which is ejected from the introduction-side absorption tower but not still introduced in the ejection-side absorption tower, and returning it to the introduction-side tank; and controlling the pH of the absorbing liquid in one of the introduction-side absorption tower and ejection-side absorption tower to a value low enough (for example from 4.0 to 5.0) not to easily cause release of ammonia into the exhaust gas.

The present invention makes it possible to effectively remove a sulfur dioxide gas from the exhaust gas and at the same time, control the ammonia concentration in the treated exhaust gas to by far lower than that of the conventional apparatus or method by employing as an apparatus constitution a parallel counter flow type small-sized vapor-liquid contact apparatus having a parallel flow type absorption tower and a counter flow type absorption tower in combination. It is therefore possible to prevent air pollution caused by harmful substances in the exhaust gas more practically and more completely.

DETAILED DESCRIPTION OF PREFERRED EMBODIMENTS

The embodiments of the present invention will hereinafter be described with reference to the accompanying drawings.

First Embodiment

Figure 1:
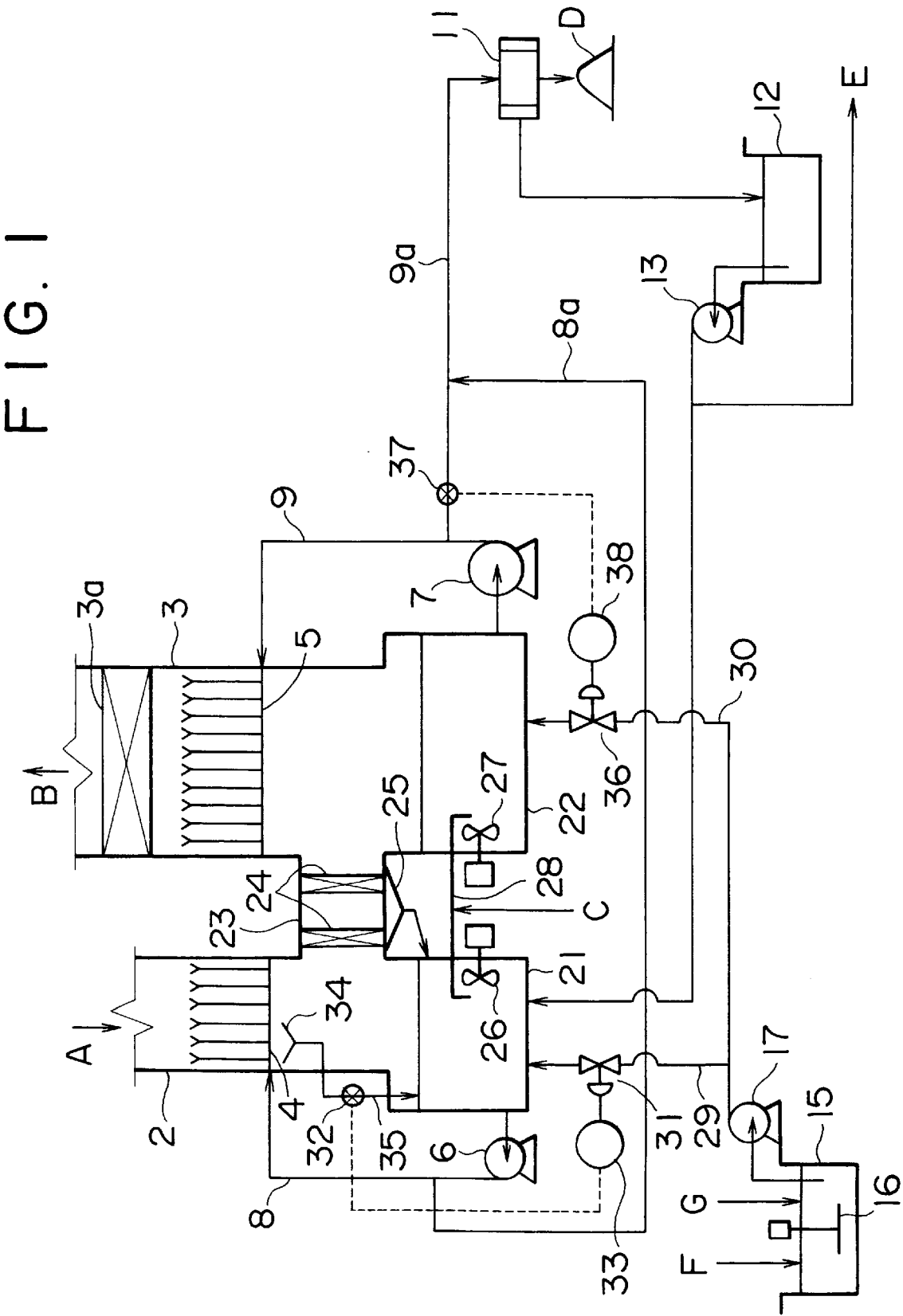
FIG. 1 is a schematic view illustrating the constitution of the exhaust gas treatment apparatus according to the first embodiment of the present invention.
Figure 3:
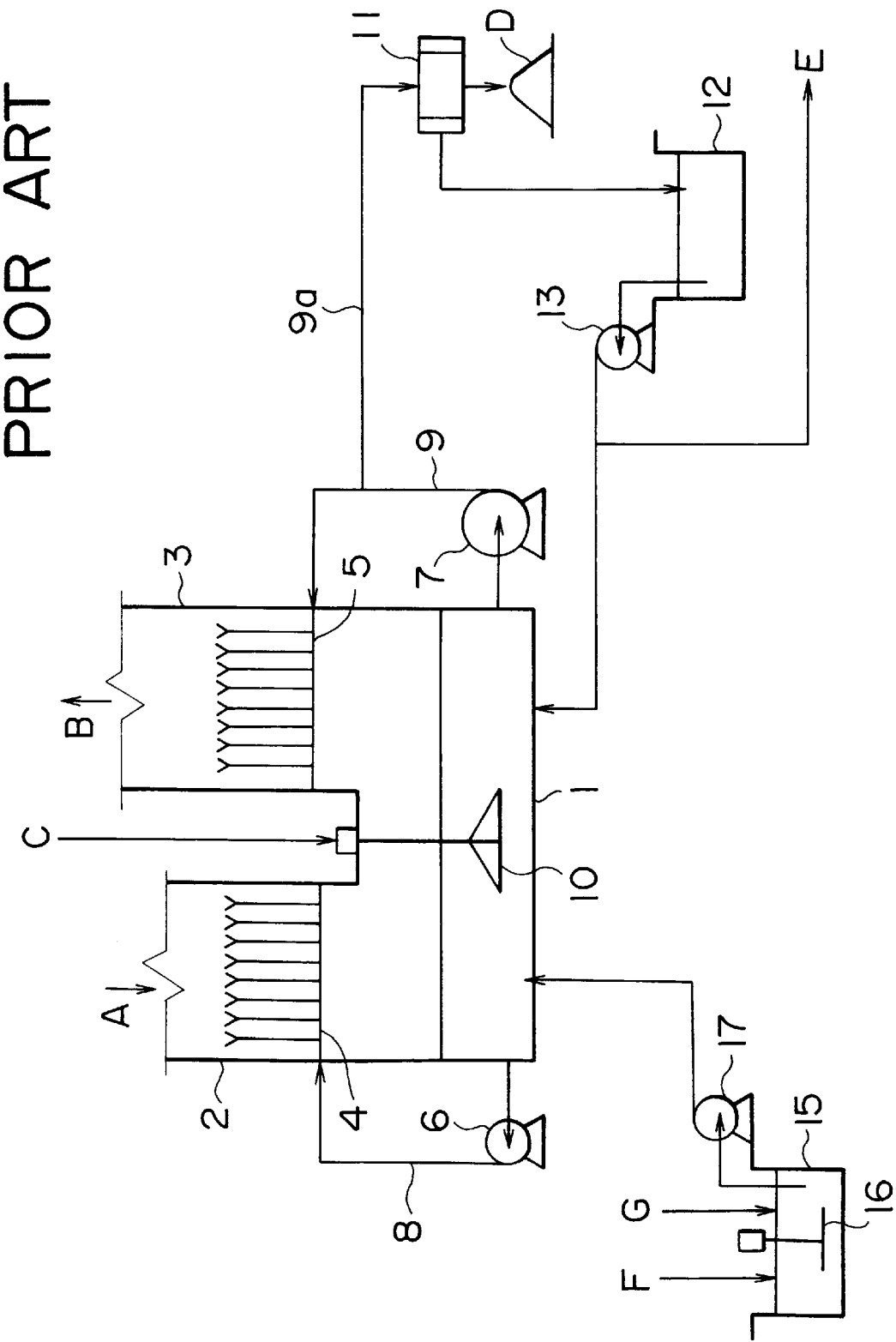
FIG. 3 is a schematic view illustrating the conventional exhaust gas treatment method.

FIG. 1 is a schematic view illustrating the constitution of the exhaust gas treatment apparatus according to the first embodiment. First, the description will be made of this constitution. Incidentally, like elements in FIG. 3 will be identified by like reference numerals and overlapping descriptions will be omitted.

In this embodiment, as illustrated in FIG. 1, a tank of the vapor-liquid contact apparatus is divided into two, that is, an introduction-side tank 21 and an ejection-side tank 22. Above these tanks, the introduction-side absorption tower 2 and the ejection-side absorption tower 3 are extensively disposed, respectively. The introduction-side absorption tower 2 and the ejection-side absorption tower 3 are connected at the lower parts thereof with a duct 23, through which an exhaust gas is sequentially introduced into each absorption tower. The exhaust gas is then brought into vapor liquid contact with an absorbent slurry in each of the parallel-flow type and counter-flow type absorption towers. The apparatus has therefore a so-called parallel counterflow type constitution.

The duct 23 is equipped with a mist eliminator 24 for collecting and removing the carrier mist from the exhaust gas (ejected from the introduction-side absorption tower 2 but not still introduced into the ejection-side absorption tower 3) passing through this duct. The mist collected by the mist eliminator 24 is accumulated in a lower hopper 25 and returned to the introduction-side tank 21 through a drainage pipe at the bottom of the hopper.

In this case, the tanks 21, 22 are equipped with agitators 26,27 and a pipe 28 for blowing an oxidation air C is disposed in the vicinity of the agitating elements of the agitators 26,27, respectively. The slurries in the tanks 21,22 are agitated by the agitators 26,27, respectively. The oxidation air C is blown into the slurries in the tanks 21 and 22 as fine air bubbles through the pipe 28.

From a slurry preparation tank 15 for preparing the absorbent in the form of a slurry, the absorbent is then supplied to the tanks 21 and 22, respectively through a pipe line branched into two (lines 29,30) at the discharge side of the pump 17.

In this case, an opening degree of a flow rate control valve 31 disposed in the line 29, which feeds the absorbent to the introduction-side tank 21, is controlled by a controller 33 based on the detection output of a pH sensor 32, whereby the pH of the slurry flowing at the lower part of the introduction-side absorption tower 2 is maintained at a value low enough (for example from 4.0 to 5.0) not to easily cause the release of ammonia to the exhaust gas.

Here, the pH sensor 32 is disposed to measure the pH of one portion of the slurry which flows down to the lower part of the absorption tower 2 while being injected from the spray pipe 4 and brought into vapor-liquid contact with the exhaust gas. Described specifically, below the spray pipe 4, a slurry receiver 34 for receiving the slurry which is flowing down to the lower part of the absorption tower 2 is disposed and the pH of this slurry on the way from the slurry receiver 34 to the tank 21 through a pipe 35 is measured by the pH sensor 32.

A controller 33 is set to decrease the supply amount of the absorbent, which functions as an alkali agent, in proportion to the proportional sensitivity when the pH value measured by a pH sensor 32 exceeds the target control value (for example 4.5); and on the contrary, to increase the supply amount of the absorbent in proportion to the proportional sensitivity when the value drops below the target control value.

The opening degree of a flow rate control valve 36 disposed on the line 30, which supplies the ejection-side tank 22 with the absorbent, is controlled as usual by a controller 38 based on the detection output of a limestone concentration sensor 37, the value of an inlet sulfur dioxide gas concentration detected by a sensor (not illustrated) and the like, by which pH inside the ejection-side tank 22 is maintained as usual at the value (for example about 6.0) optimum for the absorption of a sulfur dioxide gas from the exhaust gas or oxidation reaction.

The filtrate returned from a filtrate tank 12 through a pump 13 is only fed to the introduction-side tank 21 so that ammonia absorbed in the slurry liquid in the introduction-side absorption tower 2 does not mix in the slurry in the ejection-side tank 22.

In this example, the cross-sectional area of the flow path of the ejection-side absorption tower 3 is set relatively larger than that of the introduction-side absorption tower 2, by which a high flow rate of the exhaust gas is actualized in the introduction-side absorption tower 2, resulting in the effective collection of the dust. In the ejection-side absorption tower 3, on the other hand, a large vapor-liquid contact capacity is secured, by which absorption of a sulfur dioxide gas can be carried out particularly effectively. The capacity of the introduction-side tank 21 is set relatively smaller than that of the ejection-side tank 22 according to the above-described difference in the capacity between absorption towers.

In this case, for the purpose of adjusting the concentration in the introduction-side tank 21 to a fixed value, the slurry in the introduction-side tank 21 is ejected by a pipe line 8a, which is branched from a circulation line 8, and is sent to a solid-liquid separator 11 together with the slurry ejected from the ejection-side tank 22 by a pipe line 9a, whereby they are subjected to solid-liquid separation. Indicated at the reference number 3a in FIG. 1 is a collector, which is disposed above the ejection-side absorption tower 3, for collecting the splash mist in the treated exhaust gas B.

A description will next be made of one example of the operation of the above-described exhaust gas treatment apparatus, that is, the exhaust gas treatment method of the present invention.

In the above-described constitution, the untreated exhaust gas A is first brought into vapor-liquid contact with the slurry injected in the liquid column form from the spray pipe 4 in the parallel flow type introduction-side absorption tower 2 and there, dust and ammonia are absorbed or collected together with a sulfur dioxide gas. Particularly in this introduction-side absorption tower 2, the pH at the lower part of the tower is maintained, by the above-described control treatment of the controller 33 based on the detection value of the pH sensor 32, at a value low enough not to easily cause release of ammonia so that almost all the ammonia is absorbed in the slurry liquid. In addition, the flow channel of the introduction-side absorption tower 2 is set to have a small cross section so that the exhaust gas is brought into contact with the slurry at a high velocity, which effectively causes collision dedusting, whereby almost all the dust in the exhaust gas is collected in the slurry in this introduction-side absorption tower 2.

The slurry which has absorbed or collected dust and ammonia together with a sulfur dioxide gas from the exhaust gas in this introduction-side absorption tower 2 flows down into the introduction-side tank 21. On the other hand, mist which contains ammonia splashed in the exhaust gas by the vapor-liquid contact in this introduction-side absorption tower 2 is collected by the mist eliminator 24 at the time when it passes through the duct 23 and is then returned to the introduction-side tank 21 through the hopper 25.

The exhaust gas passing through the duct 23 and flowing into the lower part of the ejection-side absorption tower 3 hardly contains ammonia or dust and a sulfur dioxide gas remaining in the exhaust gas is mainly absorbed and removed by the vapor-liquid contact in the subsequent ejection-side absorption tower 3. At this time, the slurry injected in the liquid column form from the spray pipe 5 in the ejection-side absorption tower 3 has a relatively high pH, about 6.0. This slurry does not contain ammonia so that no release of ammonia occurs. Accordingly, the treated exhaust gas B having markedly suppressed concentrations in any of sulfur dioxide gas, dust and ammonia is discharged from the ejection-side absorption tower 3. According to the calculation of the inventor, particularly the ammonia concentration is suppressed to as low as about 5 ppm in the treated exhaust gas B even if the concentration in the untreated exhaust gas A is 100 ppm or so.

In the introduction-side tank 21 or the ejection-side tank 22, the sulfur dioxide gas absorbed in the slurry is oxidized by fine air bubbles blown into the slurry by the pipe 28 and agitator 26,27, whereby gypsum is formed as usual by the reactions shown by the above-described reaction formulas (1) to (3) and then separated by the solid-liquid separator 11.

The ammonia in the exhaust gas mainly absorbed in the slurry liquid in the introduction-side absorption tower 2 is separated into the liquid phase side by the solid-liquid separation treatment in the solid liquid separator 11 and is finally discharged out of the system in the form dissolved in the desulfurized waste water E through a pipe line branched at the discharge side of the pump 13.

As such, the present invention makes it possible to effectively remove a sulfur dioxide gas and dust from the exhaust gas and at the same time, control the ammonia concentration in the treated exhaust gas at a low level even by using as an essential constitution a parallel counter flow type vapor-liquid contact apparatus having a parallel flow type absorption tower and a counter flow type absorption tower in combination. It is therefore possible to prevent air pollution caused by harmful substances in the exhaust gas more practically and more completely.

The Second Embodiment

Figure 2:
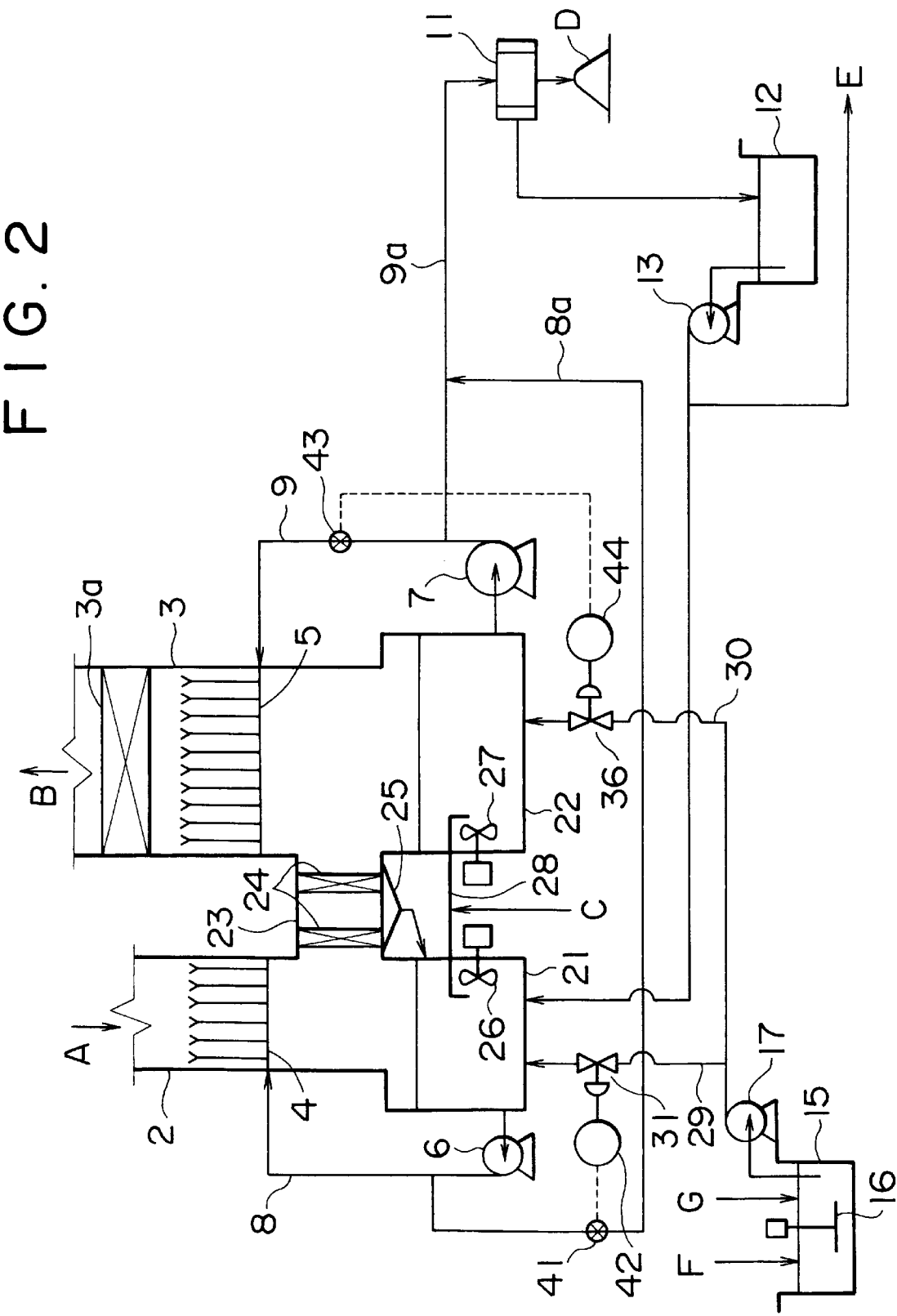
FIG. 2 is a schematic view illustrating the constitution of the exhaust gas treatment apparatus according to the second embodiment of the present invention.

The second embodiment of the present invention will hereinafter be described with reference to FIG. 2. FIG. 2 is a schematic view illustrating the constitution of the exhaust gas treatment apparatus according to the second embodiment. Incidentally, like elements in the first embodiment in FIG. 1 will be identified by like reference numerals and overlapping descriptions will be omitted.

In this embodiment, the pH of the slurry which is in an introduction-side tank 21 and is to be injected in an introduction-side absorption tower 2 is controlled at a high level as usual, while the pH of the slurry in an ejection-side tank 22 and is to be injected in an ejection-side absorption tower 3 is controlled to a value low enough not to easily cause the release of ammonia. The apparatus constitution is basically similar to that of the first embodiment, but only differs in the function of the control system for controlling the supply amount of the absorbent.

An opening degree of a flow rate control valve 31 disposed on a line 29, which feeds the absorbent to the introduction-side tank 21, is controlled as usual by a controller 42 based on the detection output of a sensor 41 for detecting a limestone concentration of the slurry discharged from a circulation pump 6 or the inlet sulfur dioxide gas concentration detected by a sensor (not illustrated), whereby the pH inside the introduction-side tank 21 is maintained as usual at the value (for example 6.0) optimum for the absorption of the sulfur dioxide gas from the exhaust gas or oxidation reaction.

The opening degree of the flow rate control valve 36 disposed on a line 30, which supplies the ejection-side tank 22 with the adsorbent, on the other hand, is controlled by a controller 44 based on the detection output of a sensor 43 for measuring the pH of the slurry discharged from a circulation pump 7, whereby the pH in the ejection-side tank 22 is maintained at a value (for example from 4.0 to 5.0) low enough not to easily cause the release of ammonia to the exhaust gas.

In the constitution according to this embodiment, the untreated exhaust gas A is brought into vapor-liquid contact with the slurry, which has been injected in the form of a liquid column from a spray pipe 4, in the parallel-flow type introduction-side absorption tower 2, whereby ammonia is absorbed or collected together with a sulfur dioxide gas and dust. For example, in the case when the ammonia concentration in the untreated exhaust gas A is about 100 ppm, the ammonia concentration in the exhaust gas ejected from the introduction-side absorption tower 2 through a duct 23 is reduced to about 10 ppm. In addition, the flow channel of the introduction-side absorption tower 2 is set to have a small cross section so that the exhaust gas is brought into contact with the slurry at a high velocity, which effectively causes collision dedusting, whereby almost all the dust in the exhaust gas is collected in the slurry in this introduction-side absorption tower 2.

The slurry which has absorbed or collected ammonia together with a sulfur dioxide gas and dust from the exhaust gas in this introduction-side absorption tower 2 flows down into the introduction-side tank 21. On the other hand, mist which contains ammonia splashed in the exhaust gas by the vapor-liquid contact in this introduction-side absorption tower 2 is collected by a mist eliminator 24 at the time when it passes through the duct 23 and is then returned to the introduction-side tank 21 through a hopper 25.

The exhaust gas passing through the duct 23 and flowing into the lower part of the ejection-side absorption tower 3 hardly contains dust and has only a small ammonia content. The sulfur dioxide gas and ammonia remaining in the exhaust gas are then absorbed and removed by the vapor-liquid contact in the ejection-side absorption tower 3. At this time, the slurry injected in the liquid column form from the spray pipe 5 in the ejection-side absorption tower 3 has a pH controlled to a relatively low level, about from 4.0 to 5.0, which suppresses the releasing phenomenon of ammonia, which has been absorbed in the slurry liquid, into the air at the upper part of the tower. Similar to the first embodiment, the treated exhaust gas B containing the sulfur dioxide gas, dust and ammonia at markedly suppressed concentrations is finally discharged from the ejection-side absorption tower 3.

The exhaust gas treatment method according to this embodiment also makes it possible to effectively remove a sulfur dioxide gas and dust from the exhaust gas and at the same time, suppress the ammonia concentration in the treated exhaust gas at a low level even by employing as an essential constitution a parallel counter flow type vapor-liquid contact apparatus having a parallel flow type absorption tower and a counter flow type absorption tower in combination. It is therefore possible to prevent air pollution caused by harmful substances in the exhaust gas more practically and more completely.

It should be noted that the present invention is not limited to or by the above-described two embodiments and embraces various embodiments. Each absorption tower is not always limited to a liquid-column type absorption tower, and a simple spray type or a packed absorption tower may be used. The liquid-column type absorption tower has by far high dedustering performance so that it exhibits excellent effects in the case when the exhaust gas contains much dust.

The pH of the absorbing liquid is not necessarily adjusted by the amount of limestone supplied as an absorbent as in the above embodiment. It is obvious that the adjustment may be carried out by charging a chemical such as sodium hydroxide separately.

In practice, it is only necessary to set as needed the pH value (a value low enough not to easily cause the release of ammonia in the exhaust gas) of the absorbing liquid in either one of the absorption tanks based on the concentration of ammonia contained in the untreated exhaust gas and permissible ammonia concentration (target value) in the treated exhaust gas with reference to the relationship as illustrated below in FIG. 4.

Figure 4:
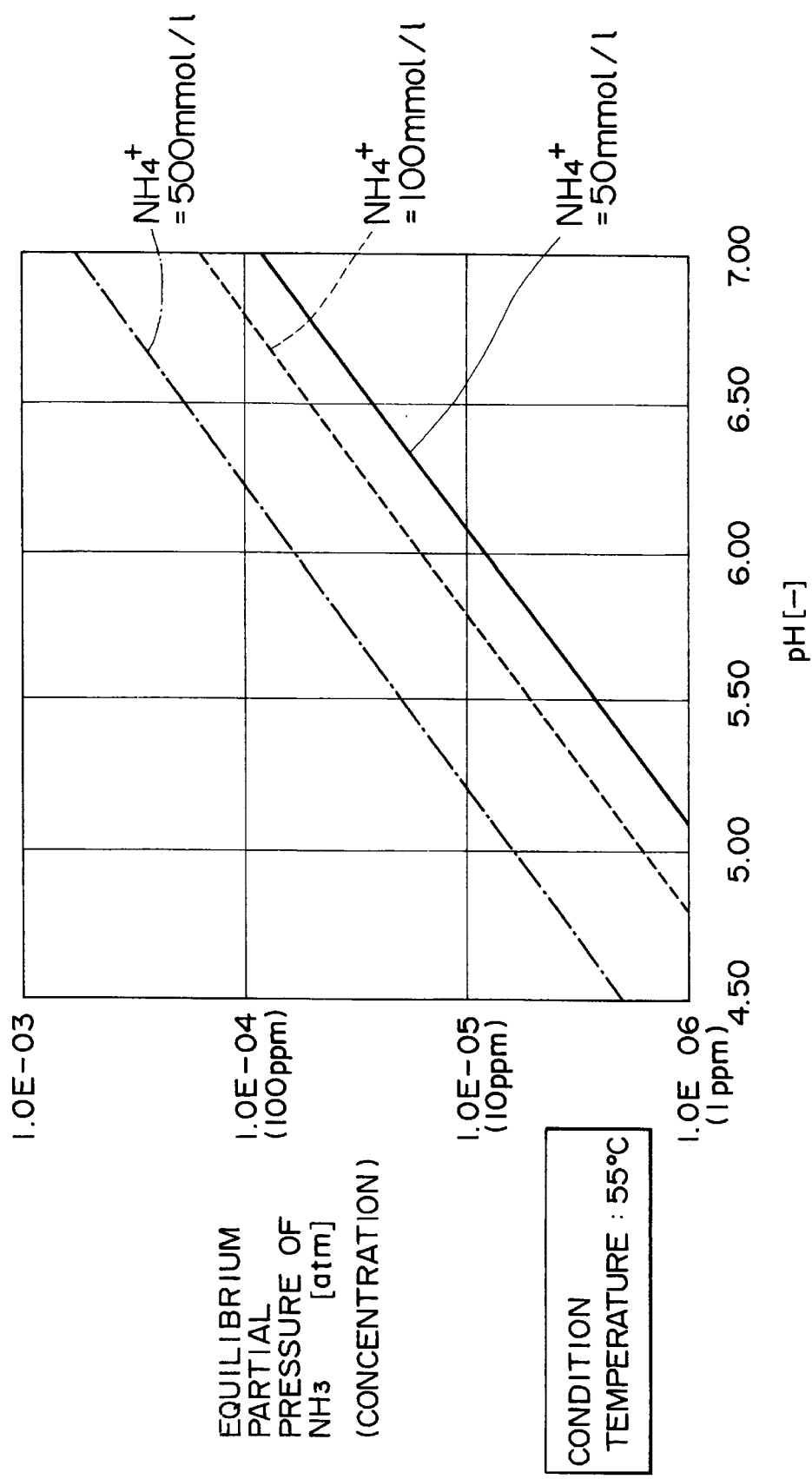
FIG. 4 is a graph illustrating the relationship (test results) between pH and equilibrium partial pressure of $NH_3$ of the absorbing liquid.

As shown in the test results of FIG. 4, the relation between the pH and equilibrium partial pressure of $NH_3$ (ammonia concentration in the gas) in the absorbing liquid varies depending on the accumulation amount of $NH_4^+$ in the absorbing liquid. It is therefore only necessary to determine the upper limit of the pH value based on the accumulation amount of $NH_4^+$ in the absorbing liquid changing with the ammonia concentration contained in the untreated exhaust gas and the permissible ammonia concentration in the treated exhaust gas with reference to the relationship shown in FIG. 4.

In the case of a desulfurizing apparatus for a VR boiler or asphalt boiler, the concentration of ammonia accumulated in the absorbing liquid is about 500 mmol/l. So, when the ammonia concentration in the treated exhaust gas is set at, for example, 10 ppm or lower, it is sufficient to maintain the pH value at 5.0 or lower as is apparent from FIG. 4. If an allowance is not considered, the pH value can be maintained at about pH 5.2.

In the case of a desulfurizing apparatus for a coal boiler, ammonia is not generally charged in the flow prior to the desulfurizing apparatus so that the ammonia concentration in the absorbing liquid becomes about 5 mmol/l, which does not cause any problem in the present process (for example, pH: about 6.0). When the ammonia is charged in the absorbing liquid for the purpose of improving the desulfurizing performance or the like, however, it is only necessary to set the pH value of one of the absorption towers at a low level based on the relationship illustrated in FIG. 4.

It is preferred to maintain the desulfurizing performance and gypsum quality at higher levels, and to set the lower limit of the pH value at not lower than 4 in consideration that otherwise, the corrosiveness on the equipment materials becomes markedly strong which requires high-class corrosion-resistant materials and therefore is not advantageous in the cost. As is also understood from FIG. 4, it is preferred to set the upper limit of the pH value at 5.0 or lower in order to securely suppress, for the desulfurization of the oil boiler, the ammonia concentration in the treated exhaust gas to 100 ppm or lower under the practical conditions.

We claim:

1. An exhaust gas treatment method for the removal of at least one gas selected from sulfur dioxide and ammonia from an exhaust gas by bringing the exhaust gas into vapor-liquid contact with an absorbing fluid, which comprises;

using a vapor-liquid contact apparatus equipped with an introduction-side tank to which the absorbing liquid is supplied an introduction-side tank to which the absorbing liquid is supplied; a parallel-flow introduction-side absorption tower, which is disposed extensively above the introduction-side tank, for introducing from the upper part an untreated exhaust gas and bringing the exhaust gas into vapor-liquid contact with the absorbing liquid in the introduction-side tank; an ejection-side tank, which is disposed adjacent to the introduction-side tank and to which the absorbing liquid is supplied separately from the introduction-side tank; and a counter-flow ejection-side absorption tower, which is disposed extensively above the ejection-side tank, for introducing from the lower part the exhaust gas ejected from the introduction-side absorption tower and bringing the gas into vapor-liquid contact with the absorbing liquid in the ejection-side tank;

removing splash mist from the exhaust gas, which is ejected from the introduction-side absorption tower but not still introduced in the ejection-side absorption tower, and returning it to the introduction-side tank; and controlling the pH of absorbing liquid in one of the introduction-side absorption tower and ejection-side absorption tower to a range of from 4.0 to 5.0 to suppress the release of ammonia into the exhaust gas, and controlling the liquid in the other of the absorption towers at a pH sufficient for the absorption of sulfur dioxide from the exhaust gas which is higher than the pH of the liquid in said one of the absorption towers.

2. An exhaust gas treatment apparatus for the removal of at least one gas selected from sulfur dioxide and ammonia from an exhaust gas by bringing the exhaust gas into vapor-liquid contact with an absorbing fluid, which comprises:

an introduction-side tank to which the absorbing liquid is supplied;

a parallel-flow introduction-side absorption tower, which is disposed extensively above the introduction-side tank, for introducing an untreated exhaust gas from the upper part and bringing the exhaust gas into vapor-liquid contact with the absorbing liquid in the introduction-side tank;

an ejection-side tank, which is disposed adjacent to the introduction-side tank and to which the absorbing liquid is supplied separately from the introduction-side tank;

a counter-flow ejection-side absorption tower, which is disposed extensively above the ejection-side tank, for introducing from the lower part the exhaust gas ejected from the introduction-side absorption tower and bringing the gas into vapor-liquid contact with the absorbing liquid in the ejection-side tank;

a mist eliminator for removing splash mist from the exhaust gas, which is ejected from the introduction-side absorption tower but not still introduced into the ejection-side absorption tower, and returning it to the introduction-side tank; and a controller to control the pH of the absorbing liquid in one of the introduction-side absorption tower and ejection-side absorption tower to a range of from 4.0 to 5.0 to suppress the release of ammonia into the exhaust gas, and to control the liquid in the other of the absorption towers at a pH sufficient for the absorption of sulfur dioxide from the exhaust gas which is higher than the pH of the liquid in said one of the absorption towers.

* * * * *